United States Patent Office 2,831,019
Patented Apr. 15, 1958

2,831,019

METHOD OF PREPARING QUATERNARY AMMONIUM NAPHTHENATES

Archibald M. Erskine, Berkeley, Calif., assignor to California Ink Company, Inc., San Francisco, Calif., a corporation of Delaware No Drawing. Application July 27, 1956
Serial No. 600,395

5 Claims. (Cl. 260—501)

This invention relates to high molecular weight, long chain alkyl quaternary ammonium naphthenates, which are oil soluble and water dispersible and which are valuable for anti-microbial purposes because of their bactericidal, fungicidal and algaecidal properties.

One method of manufacturing this type of compound is disclosed in United States Patent No. 2,519,924, and it is based on reacting a quaternary ammonium chloride with sodium naphthenate, both of the reactants being dissolved in ethyl alcohol. The sodium chloride by-product is precipitated and filtered from the solution of the quaternary ammonium naphthenate in the alcohol. Disadvantages of this type of process are the use of a solvent medium and the relatively high chloride content of the product, amounting to as much as 1% due to the slight solubility of sodium chloride in alcohol.

Another method is disclosed in United States Patent 2,645,593 and involves the reaction between a quaternary ammonium chloride and sodium naphthenate in very dilute aqueous solutions. The reaction product is obtained in emulsion form and is recovered by extraction with an immiscible solvent, such as ether, from which the quaternary ammonium naphthenate is recovered in pure form by evaporation of the solvent. This process has several practical disadvantages, including the small batch size necessitated by the high dilution used in the reaction, and the expense and hazards of extraction by ether and similar solvents.

It is an object of this invention to eliminate the necessity of using organic solvents, as in prior art processes, either as the reaction medium or for extraction purposes. It is a further object of the invention to carry out the reaction to produce quaternary ammonium naphthenates at high concentrations of the reactants in water with important economies resulting from the increased batch size of product. It is an additional object of the invention to prepare quaternary ammonium naphthenates having an extremely low chloride content.

To summarize this invention, these objects are accomplished in my novel and improved process by reacting in aqueous solution a quaternary ammonium halide having a long chain alkyl group attached thereto with a salt of naphthenic acid; the combined weight of the quaternary ammonium halide and salt of naphthenic acid reactants being at least about 5 percent by weight, and preferably above about 10 percent of the total weight of such reactants and the water which together make up the reaction mixture. At these or higher concentrations the quaternary ammonium naphthenates, which are formed by the reaction in substantially theoretical yields, show as a class the remarkable property of separating into an oily layer, which contains all of the quaternary ammonium naphthenate with a large amount of pure water dissolved in it. The other layer consists of clear water, which contains the dissolved halide by-product and the cation from the salt of naphthenic acid, but is completely free of the quaternary ammonium naphthenate. The two layers are then separated by mechanical separation means, such as by siphoning off the water or by a separatory funnel in which the immiscibility and difference in specific gravity of the layers is utilized.

This unexpected result seems to be related to the fact that high molecular weight quaternary ammonium naphthenates, although extremely insoluble in water, have a high solubility for water. When such compounds separate as oily layers from a concentrated aqueous reaction mixture they contain relatively large amounts of dissolved pure water. This water content may vary from about 25 percent by weight up to 85 percent or even higher, but in any case the quaternary ammonium naphthenate containing the dissolved water is a distinct layer which can be readily handled as an oil, the layer of quaternary ammonium naphthenate containing dissolved water being referred to herein as the oily layer.

If the concentration of the reactants is too low, the product tends to form an emulsion from which the product is readily obtained only by extraction with an organic solvent. However, when the reaction is conducted with relatively high concentrations of the reactants in accordance with the method hereof, the oily layer is readily and completely separated from the aqueous layer by mechanical separation means. This eliminates the problems encountered in the prior methods in which organic solvents are employed and greatly simplifies the preparation of these anti-microbial compounds. The quaternary ammonium naphthenate oily layer may be washed several times with fresh portions of water to completely remove salts. In order to prepare a commercial product that always contains a uniform amount of water, the final separated oily layer, if higher than desired in water content, may be heated to drive off some of the dissolved water to bring the product to the desired composition, such as 30 percent quaternary ammonium naphthenate and 70 percent water. On the other hand, if the oily layer is more concentrated as to quaternary ammonium naphthenate than desired, it may be adjusted by addition of water. The product, either adjusted in its water content or not adjusted, is exceptionally well suited for the practical preparation of dilute emulsions at use-concentrations.

Any quaternary ammonium halide may be employed in the method hereof that is water soluble and contains at least one long chain alkyl group with an average straight or branched chain length of from $C_8$ to $C_{18}$. The term alkyl as used herein means either saturated or unsaturated aliphatic radicals. Shorter alkyl chains do not provide the desired anti-microbial properties in the final product, and the higher molecular weight quaternary ammonium halides do not generally have the requisite solubility in water to enable the reaction to be conducted in aqueous media. The more useful of the quaternary ammonium halides are represented by the following general structural formulas, and the quaternary ammonium naphthenates formed by the reaction of such halides with naphthenates have the same structure except for the presence of the anion of naphthenic acid from petroleum instead of the halide.

I.

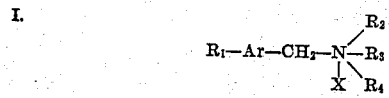

where $R_1$ is an alkyl group containing from 8 to 18 carbon atoms; Ar is an aromatic radical, such as a benzene or alkyl benzene residue which may be halogenated; $R_2$, $R_3$ and $R_4$ are the same or different lower alkyl radicals, such as methyl, ethyl or propyl, the three radicals totaling not more than 10 carbon atoms in order that the quaternary ammonium naphthenate be water soluble, $R_2$, $R_3$ and $R_4$ may together with the nitrogen comprise a heterocyclic radical, such as pyridine, quinoline, imidazoline or the like; and X is a halogen.

II.
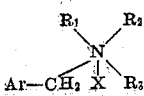

where $R_1$ is a saturated or unsaturated alkyl group containing 8 to 18 carbon atoms; $Ar—CH_2$ is a benzyl group, which may be halogenated in the benzene ring; and $R_2$ and $R_3$ are the same or different lower alkyl radicals, such as methyl or ethyl.

III.
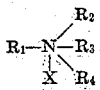

where $R_1$ is a saturated or unsaturated alkyl group containing 8 to 18 carbon atoms; $R_2$, $R_3$ and $R_4$ are the same or different lower alkyl radicals, such as methyl or ethyl; and $R_2$, $R_3$ and $R_4$ may together with the nitrogen comprise a heterocyclic radical as in I.

IV.
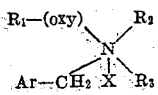

where in the type II structure above, (oxy) is a group that contains the linkage C—O—C as exemplified by aryloxy groups, such as phenoxy, or alkoxy groups, such as ethoxy, or both aryloxy and alkoxy groups.

Typical water soluble quaternary ammonium halides which are available commercially and which may be reacted according to this process to form quaternary ammonium naphthenates are:

Di-isobutyl phenoxy ethoxy ethyl dimethyl benzyl ammonium chloride monohydrate
Alkyl ($C_9$–$C_{15}$) benzyl trimethyl ammonium chloride
Alkyl ($C_9$–$C_{15}$) tolyl-methyl trimethyl ammonium chloride
Alkyl ($C_{12}H_{25}$) benzyl triethyl ammonium chloride
Alkyl ($C_{12}H_{25}$) dimethyl benzyl ammonium chloride
Cetyl ($C_{16}H_{33}$) pyridinium chloride
Dodecyl trimethyl ammonium chloride
Alkyl ($C_8$–$C_{18}$) dimethyl 3,4-dichloro benzyl ammonium chloride
Alkenyl ($C_{18}$) dimethyl ethyl ammonium bromide
Cetyl dimethyl benzyl ammonium chloride
Dodecyl isoquinolinium bromide
(Acyl-colamino-formyl-methyl) pyridinium chloride
Dodecyl benzyl hydroxy-ethyl imidazolinium chloride
Dodecyl naphthyl pyridinium chloride Equivalents for chloride ion in the quaternary salt reactants are bromide or iodide ion.

As described in the aforementioned patents, salts of naphthenic acid, or in other words, naphthenates, are prepared by the reaction of a base with naphthenic acid. Bases that provide water soluble salts of naphthenic acid, such as sodium hydroxide, potassium hydroxide and ammonium hydroxide are employed, and the potassium and ammonium naphthenates may be employed in the reaction.

Both the quaternary ammonium halide and the alkali metal naphthenate employed herein are water soluble and they are reacted in an aqueous medium to provide the water insoluble quaternary ammonium naphthenate. A concentration of the reactants is employed that is sufficiently high to provide a separate oily layer of the reaction products distinct from the salt water layer, rather than an emulsion. As previously related, the combined weight of the quaternary ammonium halide and salt of naphthenic acid reactants should comprise at least about 5 percent by weight, and preferably above 10 percent by weight of the total weight of such reactants and water in the reaction mixture in order to increase the demarcation between the two layers and increase the amount of product in a given size batch. Most conveniently each of the reactants is dissolved in water to form separate solutions of the reactants that are about equal in concentration, and the solutions are then mixed together.

The quaternary ammonium halide reacts with the naphthenate in equi-molar amounts to split off the cation from the naphthenate and the halide which are then dissolved in the separate water layer, and to form the quaternary ammonium naphthenate which appears in a separate oily layer containing dissolved pure water. Consequently, the molecular weight of the cation with respect to the long chain alkyl group ($C_8H_{17}$ to $C_{18}H_{37}$) should be known accurately for the purpose of adjusting the reaction to a good stoichiometric balance.

An excess of naphthenate in the amount of about 3 to 5 molar percent is generally preferable, although good preparations can be made if the quaternary ammonium salt reactant is in slight excess. If in large excess, however, the difficulty of removing chloride ion from the oil layer is increased and there is also danger of the entire system becoming solubilized. Vigorous agitation and slow addition of reactants are important to insure completion of the reaction converting the quaternary ammonium halide to naphthenate, and especially to prevent reactant adsorptions causing undesirable thickening of the mixture.

The formation of the quaternary ammonium naphthenate occurs satisfactorily in the pH range of 4 to 10, but the range 6 to 9 appears generally preferable for the reaction and the steps subsequent thereto, in order to avoid undesirable side reactions. If the pH is too high there is a tendency to form the quaternary ammonium hydroxide, and with a low pH the naphthenate forms naphthenic acid. Usually the pH of the mixture falls within the desired range. In any event the pH is readily adjusted by addition of small amounts of acid or base.

It is usually possible to carry out the process entirely at ordinary temperatures, e. g. 20–25° C., but for quatenary ammonium naphthenates with melting points appreciably above this range, slight heating is necessary to maintain the product in a liquid condition with not too high a viscosity. For any given quaternary ammonium cation a highly efficient process can be provided which gives substantially 100 percent of the theoretical yield of quaternary ammonium naphthenate product. The product appears as a separate oily layer containing a high concentration of dissolved water, which gives the product a particularly useful form.

The oily layer is readily separated from the layer of water containing the dissolved alkali metal halide by-products with any suitable mechanical means, such as with a separatory funnel. As previously mentioned, washing in pure water readily removes any small amounts of salt remaining in the oily layer. Also, the balance of water dissolved in the oily layer is easily adjusted by heat to drive off water or by adding water to increase the water content.

Quaternary ammonium naphthenates prepared by the process of this invention, when added to water with mild agitation but without emulsifying agents, give very stable emulsions. The concentration range of these self-emulsions is from 0.01% or less up to 1% or slightly higher, which approximates the use-concentrations for the application of these compounds as anti-microbials. The stability of the self-emulsions is so great that no separation is observable over a period of months or even years. The process gives a product containing only the quaternary ammonium naphthenate with pure water dissolved in it. It is consequently ideally suited for the preparation of such self-emulsions by simple dilution with a large amount of additional water.

The very low chloride ion content of the quaternary ammonium naphthenates made by this process is an important practical advantage in relation to the stability of the self-emulsions. As shown in Example 1, chloride contents as low as 0.001 percent can be readily obtained in the laboratory. On a plant scale with only two water washes the chloride content of the oily layer can be reduced to 0.02 percent (0.06 percent on the basis of the pure compound). If the chloride ion content of the quaternary ammonium naphthenate oily water insoluble product is too high, the product does not form stable emulsions when water is added. However, when the quaternary ammonium naphthenate is prepared in accordance with this invention, the low chloride content of the oily layer enables it to form very stable aqueous emulsions.

The quaternary ammonium naphthenates prepared by the method hereof are most useful for their anti-microbial properties. For example, they show superior effectiveness in preventing the deterioration of cellulosic fabrics by bacteria, mildew and other types of mold growth. Also, paper treated by emulsions of the quaternary ammonium naphthenates not only are protected against bacterial and fungal deterioration, but in addition a plasticizing action is produced on the paper without causing a reduction in tensile strength. This treatment renders heavy paper bags particularly well adapted for packaging agricultural products, such as dried natural fertilizers. The bags so treated become highly resistant to the deteriorating action of bacteria from the contents and at the same time have much higher strength than similar bags treated with water soluble quaternary ammonium germicides.

In addition to the anti-microbial, self-emulsifying and oil solubility properties, the quaternary ammonium naphthenates prepared by this process have excellent rust inhibitive properties. This unusual combination of properties makes the compounds useful for rust inhibitors in petroleum wells where corrosion problems caused by acids or by sulfur consuming bacteria in primary and secondary oil production are serious; rust inhibitors in fuel oil storage tanks; and for cold sterilizing of surgical and dental instruments, in which the absence of chloride ion in self-emulsions of the quaternary ammonium naphthenates makes unnecessary the use of nitrite rust inhibitors.

The following examples are illustrative of the preparation of various quaternary ammonium naphthenates by the principle of this invention:

EXAMPLE 1

*Alkyl ($C_9$–$C_{15}$) benzyl trimethyl ammonium naphthenate*

An aqueous 10 percent solution containing 258 grams of alkyl ($C_9$–$C_{15}$) benzyl trimethyl ammonium chloride was prepared by diluting 516 grams of a 50 percent solution with 2070 grams of water. When corrected for 5 percent of non-quaternary material in the 50 percent solution, the amount of quaternary compound taken was 0.66 mol, on the basis of $C_{12}H_{25}$ for the long chain alkyl group.

A solution of sodium naphthenate (10 percent concentration in terms of naphthenic acid) was prepared by dissolving 159 grams naphthenic acid (0.69 mol) in 1410 grams of water containing 27.6 grams sodium hydroxide (97 percent). This solution had a pH of 8–9.

The quaternary ammonium chloride solution was added to the naphthenate solution in 30 minutes at room temperature with good agitation. The pH at the end of the reaction was approximately 7.0. An upper oily layer separated rapidly from a clear water layer. A sample of the latter gave a slight test for naphthenate. (This test was made by adding to small portions of the water layer a few drops of a 1 percent solution of each of the reactants. The reactant in excess was readily shown by a cloudiness (dispersion) when the opposite reactant was added.)

After separating the two layers by siphoning off the water layer, the oil layer was washed with about 1800 grams water. A similar formation of two liquid layers occurred. The separation and washing was repeated twice again with 2000–2200 grams water. The final oil layer weighed 2406 grams. Its water content by evaporation test on a small sample was 85.8 percent. The yield was therefore 2406×0.142 or 342 grams of alkylbenzyl trimethyl ammonium naphthenate, compared to a theoretical yield (0.66 mol) of 363 grams (94.2 percent).

In another experiment carried out under identical conditions to the above, analysis of the oil layer after three washes gave a chloride content of 0.001 percent. A plant scale batch made under corresponding conditions showed after only two water washes a chloride content of 0.02 percent (or 0.06 percent on the basis of the pure compound).

The product prepared in this example showed in tests by the standard F. D. A. method a phenol coefficient of 223 against *Staphylococcus aureus* and 200 against *Salmonella typhosa*, calculated on the 100 percent basis for the compound.

A test was made in which 10 grams of a 2 percent self-emulsion of the product was adsorbed completely by 10 grams of canvas, giving 2 percent of adsorbed compound based on the weight of the cloth. This treated fabric showed outstanding resistance to decomposition by soil bacteria when subjected to a soil burial test.

EXAMPLE 2

*Alkyl ($C_9$–$C_{15}$) benzyl trimethyl ammonium naphthenate*

An aqueous solution containing 35.4 grams (0.1 mol) of alkyl ($C_9$–$C_{15}$) benzyl trimethyl ammonium chloride in 673 grams water (5 percent concentration), having a pH of 6.6, was added in 45 minutes with good agitation at room temperature to 546 grams of a 5 percent solution of sodium naphthenate containing 0.105 mol naphthenic acid (equivalent weight 238) as sodium naphthenate (pH 8.8). The suspension showed a pH of 7.9 at the end of the reaction.

The mixture separated rapidly into two layers on standing, the aqueous layer being very clear. It showed a test for the presence of a slight excess of the quaternary ammonium chloride reactant. The layers were separated in a separatory funnel, the oil layer giving a weight of 242 grams. The oil layer was shaken with 500 grams water and separation of layers was again rapid. The oil layer after removal from the water layer weighed 246 grams. A second washing with 500 grams water give a good separation, from which an oil layer weighing 253 grams was obtained. Analysis of this oil showed a water content of 74.9 percent and a yield of 63.5 grams of alkylbenzyl trimethyl ammonium naphthenate (anhydrous basis).

EXAMPLE 3

*Alkyl ($C_9$–$C_{15}$) toly-methyl trimethyl ammonium naphthenate*

An aqueous 10 percent solution was prepared containing 0.2 mol (65.0 grams) of alkyl ($C_9$–$C_{15}$) tolylmethyl trimethyl ammonium chloride with an average molecular weight of 325, corresponding to a long chain alkyl group equal to $C_9H_{19}$. This water soluble quaternary ammonium germicide is also known commercially by the name "methyl alkylbenzyl trimethyl ammonium chloride." It is a homolog of the quaternary ammonium chloride used in Examples 1 and 2, the homologous methyl group being in the benzene ring of the benzyl group.

This solution was added dropwise with good agitation to a solution containing 50.8 grams (0.21 mol, equivalent weight 242) of naphthenic acid, as sodium naphthenate, in 9.3 percent concentration of the latter. The initial pH's were 6.6 for the quaternary chloride and 9.2 for the sodium naphthenate solution. The pH of the suspension after the reaction was adjusted to 8.0. On standing, an orange colored oil layer and a very slightly cloudy aqueous layer formed. The latter showed a positive test for excess naphthenate. The oil layer weighed 328 grams. After separation from the aqueous layer in a separatory funnel, it was washed with 500 grams water. This gave, after settling and separation, an oil layer of 287 grams. A second washing with 500 grams water gave a final oil layer weighing 262 grams.

Analysis of this oil layer for water content by n-hexane distillation gave 59.6 percent water and 40.4 percent non-volatile reaction product or 106.0 grams, as compared with a theoretical yield of 106.1 grams of alkyltolyl methyl trimethyl ammonium naphthenate (mol. wt. 530.5).

EXAMPLE 4

Alkyl ($C_{12}$) benzyl triethyl ammonium naphthenate

A solution containing 49.5 grams (0.125 mol) of alkyl ($C_{12}H_{25}$) benzyl triethyl ammonium chloride in 725 grams water (7 percent concentration) was added in 1 hour with good agitation at room temperature to 510 grams of an 8 percent solution of sodium naphthenate containing 37.4 grams naphthenic acid (mol. wt. 238) as the sodium salt. The pH, which was 8.9 at the end of the reaction, was adjusted with dilute acetic acid to 7.3. This caused the thick emulsion to break rapidly into large oil globules which soon formed a good oil layer. Tests of the water layer showed that a slight excess of quaternary ammonium chloride was present at the end of the reaction.

After two washings, each with 500 grams water, the final oil layer weighed 710 grams and had a water content of 86.9 percent. The yield of alkylbenzyl triethyl ammonium naphthenate was therefore 93.0 grams, as compared with a theoretical yield of 94.0 grams.

EXAMPLE 5

Alkyl ($C_{12}$) dimethyl benzyl ammonium naphthenate

An aqueous 10 percent solution containing 108.8 grams of alkyl ($C_{12}H_{25}$) dimethyl benzyl ammonium chloride was added in 1 hour at 55–60° C. to 675 grams of sodium naphthenate solution (10 percent concentration). The reaction was carried out at a slightly elevated temperature in order to keep the viscosity of the mixture low enough for good mixing.

The pH at the end of the reaction was adjusted to 9.6. After separation into a very viscous oil layer and a clear water layer, the latter showed a pH of 9.1. The water layer gave a test for slight excess of naphthenate. Washings were carried out with hot water (65–70° C.) since cold water caused the reaction product to separate out as a semi-solid curd instead of an oil layer.

The oil layer after the second washing weighed 235.5 grams and had a water content of 39.6 percent. It was extremely viscous but on slight warming gave a clear, less viscous oil. The yield of alkyl dimethyl benzyl ammonium naphthenate was 142.4 grams, as compared with a theoretical yield of 173 grams.

EXAMPLE 6

Di-isobutyl phenoxy ethoxy ethyl dimethyl benzyl ammonium naphthenate

A solution of 25 percent concentration containing 0.8 mol of di-isobutyl phenoxy ethoxy ethyl dimethyl benzyl ammonium chloride monohydrate (mol. wt. 465.5) was prepared. This was run slowly at room temperature into a 25 percent solution containing 0.84 mols of naphthenic acid (mol. wt. 242) as sodium naphthenate (pH 10). The pH after the reaction was 8.0 and a sample of the mixture showed a positive test for excess naphthenate.

The reaction mixture was heated to about 80° C. and then cooled to room temperature over night, during which it separated into two layers. The quaternary ammonium naphthenate product (oil layer) in this case was exceptional since at room temperature it was heavier than water. The water layer was removed by siphoning off.

After three washings with 2000–2200 grams water each, an oil layer of the quaternary ammonium naphthenate weighing 832 grams was obtained. It contained 34.5 percent water (by evaporation analysis) indicating a substantially theoretical yield of product of molecular weight 653. The product prepared in this example had a phenol coefficient of 295 (100 percent basis) against *S. aureus* and 215 (100 percent basis) against *S. typhosa*.

I claim:

1. The method of preparing an oil soluble, water dispersible quaternary ammonium naphthenate having antimicrobial properties which comprises mixing in aqueous solution a quaternary ammonium halide reactant selected from the group consisting of quaternary ammonium chlorides, bromides and iodides having attached thereto a long chain alkyl group containing between eight and eighteen carbon atoms, and a water-soluble salt of naphthenic acid reactant, said quaternary ammonium halide reactant and the naphthenate salt reactant being reacted in substantially equimolar amounts and the combined weight of said reactants being at least about five percent by weight of the total weight of the reactants and the water which together make up the reaction mixture; agitating said reactants until they react to form (1) an upper oily layer containing substantially all of the quaternary ammonium naphthenate reaction product, any water contained in said layer being dissolved in said reaction product, and (2) a lower aqueous layer consisting essentially of a solution of the salt of the halogen and the cation from the salt of naphthenic acid reactant, said aqueous layer being substantially free of quaternary ammonium naphthenate reaction product; and effecting physical separation of said oily layer of quaternary ammonium naphthenate from said aqueous layer by withdrawing one of said layers from the other layer.

2. The method of claim 1 in which the quaternary ammonium halide has the formula

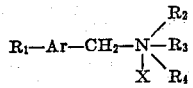

where $R_1$ is an alkyl group containing from 8 to 18 carbon atoms; Ar is an aromatic radical; $R_2$, $R_3$ and $R_4$ are alkyl radicals totalling not more than 10 carbon atoms; and X is a halogen selected from the group consisting of chlorine, bromine and iodine.

3. The method of claim 1 in which the quaternary ammonium halide has the formula

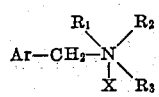

where $R_1$ is an alkyl group containing 8 to 18 carbon atoms; Ar—$CH_2$ is a benzyl group; $R_2$ and $R_3$ are lower alkyl radicals; and X is a halogen selected from the group consisting of chlorine, bromine and iodine.

4. The method of claim 1 in which the quaternary ammonium halide has the formula

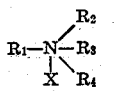

where $R_1$ is an alkyl group containing 8 to 18 carbon atoms; $R_2$, $R_3$ and $R_4$ are lower alkyl radicals; and X is a halogen selected from the group consisting of chlorine, bromine and iodine.

5. The method of claim 1 in which the quaternary ammonium halide has the formula

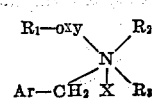

where $R_1$ is an alkyl group containing 8 to 18 carbon atoms; oxy is a group that contains the linkage C—O—C; Ar—CH$_2$ is a benzyl group; $R_2$ and $R_3$ are lower alkyl radicals; and X is a halogen selected from the group consisting of chlorine, bromine and iodine.

References Cited in the file of this patent

UNITED STATES PATENTS 2,645,593    Erskine ---------------- July 14, 1953

OTHER REFERENCES

McBain: Colloid Science (1950), p. 29.